United States Patent
Iwata et al.

(10) Patent No.: US 8,072,653 B2
(45) Date of Patent: Dec. 6, 2011

(54) IMAGE READING AND RECORDING APPARATUS

(75) Inventors: Naohiro Iwata, Yokohama (JP);
Hideyuki Terashima, Kawasaki (JP);
Hideaki Nagahara, Yokohama (JP);
Kazuyuki Morinaga, Kawasaki (JP);
Akihiro Tomoda, Yokohama (JP);
Yoshiaki Suzuki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1009 days.

(21) Appl. No.: 11/955,524

(22) Filed: Dec. 13, 2007

(65) Prior Publication Data
US 2008/0158620 A1 Jul. 3, 2008

(30) Foreign Application Priority Data

Dec. 28, 2006 (JP) .................... 2006-353984

(51) Int. Cl.
*H04N 1/04* (2006.01)

(52) U.S. Cl. ........ 358/474; 358/497; 358/496; 358/498; 271/109; 271/121

(58) Field of Classification Search .................. 358/474, 358/497, 496, 498, 406, 400; 271/109, 226, 271/121, 9.13, 9.11, 9.07, 9.01
See application file for complete search history.

(56) References Cited

U.S. PATENT DOCUMENTS

| | | | | |
|---|---|---|---|---|
| 5,012,353 A | * | 4/1991 | Yoshino et al. | 358/401 |
| 5,579,129 A | * | 11/1996 | Iwata et al. | 358/474 |
| 5,749,570 A | * | 5/1998 | Iwata et al. | 271/10.13 |
| 6,183,151 B1 | * | 2/2001 | Kono | 400/582 |
| 6,631,975 B2 | * | 10/2003 | Fukasawa et al. | 347/33 |
| 6,801,344 B2 | * | 10/2004 | Morinaga et al. | 358/474 |
| 7,088,475 B1 | * | 8/2006 | Terashima et al. | 358/448 |
| 7,605,955 B2 | * | 10/2009 | Kakuta | 358/494 |
| 2002/0033968 A1 | * | 3/2002 | Chen | 358/406 |
| 2005/0200917 A1 | * | 9/2005 | Kanesaka et al. | 358/486 |
| 2006/0268359 A1 | * | 11/2006 | Maki et al. | 358/448 |
| 2007/0076271 A1 | * | 4/2007 | Shirai | 358/498 |
| 2007/0090591 A1 | * | 4/2007 | Roberts | 271/258.01 |
| 2008/0074716 A1 | * | 3/2008 | Yoshihisa | 358/497 |

FOREIGN PATENT DOCUMENTS

| | | |
|---|---|---|
| JP | H08-181820 | 7/1996 |
| JP | H11-187212 | 7/1999 |

* cited by examiner

*Primary Examiner* — Negussie Worku
(74) *Attorney, Agent, or Firm* — Fitzpatrick, Cella, Harper & Scinto

(57) ABSTRACT

An image reading and recording apparatus has: a carriage for mounting a recording head; a reading unit which reads an original document; a conveying roller arranged on a conveying path which is used in common for recording paper and the original; and a platen arranged so as to face the recording head. The reading unit is movable between a reading position on an upper side of the conveying path and a retracting position on a lower side of the conveying path. The platen can relatively and independently move for the reading unit.

6 Claims, 15 Drawing Sheets

IMAGE READING AND RECORDING APPARATUS

BACKGROUND OF THE INVENTION

1. Field of the Invention

The present invention relates to an image reading and recording apparatus having a reading unit for reading an original document and a recording head for recording onto recording paper.

2. Description of the Related Art

In an image reading and recording apparatus having a reading unit for reading an image of an original document and a recording head for recording onto recording paper, a construction in which the recording paper and the original are conveyed along a common conveying path is used in order to realize a miniaturization and cost reduction.

In Japanese Patent Application Laid-Open No. H08-181820, an image reading and recording apparatus for reading a lower surface of the original at the time of reading an image has been disclosed. In this image reading and recording apparatus, by reading a white reference member arranged on a back surface of a platen prior to the reading operation, a white reference upon reading is specified. The image reading and recording apparatus disclosed in Japanese Patent Application Laid-Open No. H08-181820 is constructed in such a manner that upon image recording, the platen is positioned to the lower side of the common conveying path by a switching lever and the image is recorded onto the recording paper on the platen by the recording unit arranged on an upper side of the conveying path.

In Japanese Patent Application Laid-Open No. H11-187212, an image reading and recording apparatus constructed in such a manner that upon reading, while the original conveyed along a common conveying path is conveyed with passing through a gap between a reading sensor and a white reference member, an upper surface of the original is read has been disclosed. The image reading and recording apparatus disclosed in Japanese Patent Application Laid-Open No. H11-187212 is constructed in such a manner that upon recording, a reading unit is moved upward and the white reference member is moved downward by the operation of a switching lever, a recording unit is arranged in a space where the reading unit has been located, and an image is recorded onto recording paper which is conveyed along the common conveying path.

However, in the construction disclosed in Japanese Patent Application Laid-Open No. H08-181820, since the image reading surface is the lower surface of the original which is conveyed, when the original is set to a sheet stacking portion, it is set so that the image surface faces down. However, since a sheet feeding roller has been arranged on the upper side of the common conveying path, the last page of an original bundle is first separated and fed. Therefore, in the case of executing the reading operation of a plurality of originals, there is caused such a problem that order of pages to be read is reversed.

In the construction disclosed in Japanese Patent Application Laid-Open No. H11-187212, since the image reading surface is the upper surface of the original which is conveyed, in the case of executing the reading operation of a plurality of originals, the order of the pages to be read is not reversed. However, since a reading sensor and the white reference member are moved in parallel, in order to realize the precise movement, a position control member such as a rail member or the like is necessary and there is such a drawback that the construction becomes complicated. In the construction disclosed in Japanese Patent Application Laid-Open No. H11-187212, upon recording, the reading unit is moved to a position over the recording unit, thereby being retracted. According to such a construction, however, in the case of using the large recording unit, a movement amount at the time of retracting the reading unit is large, so that there is such a problem that it is difficult to miniaturize the apparatus.

SUMMARY OF THE INVENTION

It is an object of the invention to provide an image reading and recording apparatus in which a conveying path of an original document and that of recording paper are used as a common path, wherein an apparatus main body can be miniaturized while maintaining recording precision and reading precision.

Another object of the invention is to provide an image reading and recording apparatus, comprising: a carriage on which a recording head for recording onto recording paper is mounted and which moves; a conveying path which conveys the recording paper or original; a reading unit which is movable between a reading position adapted to read the original which is conveyed on the conveying path and a retracting position where the reading unit has been retracted from the conveying path; and a platen which supports the recording paper at a position that faces the recording head, is coupled with the reading unit, and moved while a relative position to the reading unit is changed when the reading unit moves.

Further features of the present invention will become apparent from the following description of exemplary embodiments with reference to the attached drawings.

BRIEF DESCRIPTION OF THE DRAWINGS

FIGS. 9A and 9B are partial front views illustrating a construction of the drive transmitting unit for transferring the driving from the conveying roller to the sheet feeding unit, in which FIG. 9A illustrates a state where the driving to the sheet feeding unit has been shut out and FIG. 9B illustrates a state where the driving can be transferred to the sheet feeding unit.

DESCRIPTION OF THE EMBODIMENTS

Figure 1:
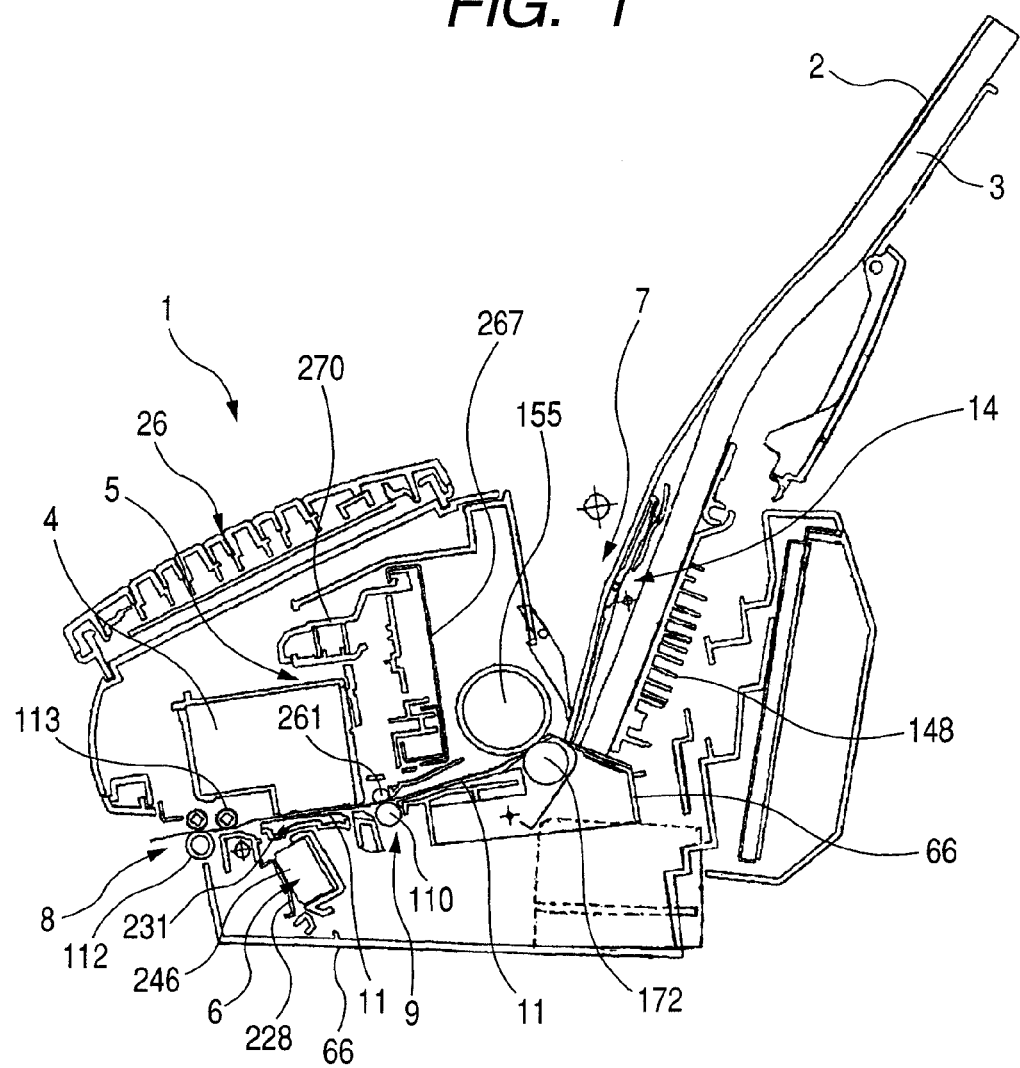
FIG. 1 is a vertical sectional view illustrating a whole construction of an image reading and recording apparatus according to an embodiment of the invention.
Figure 2:
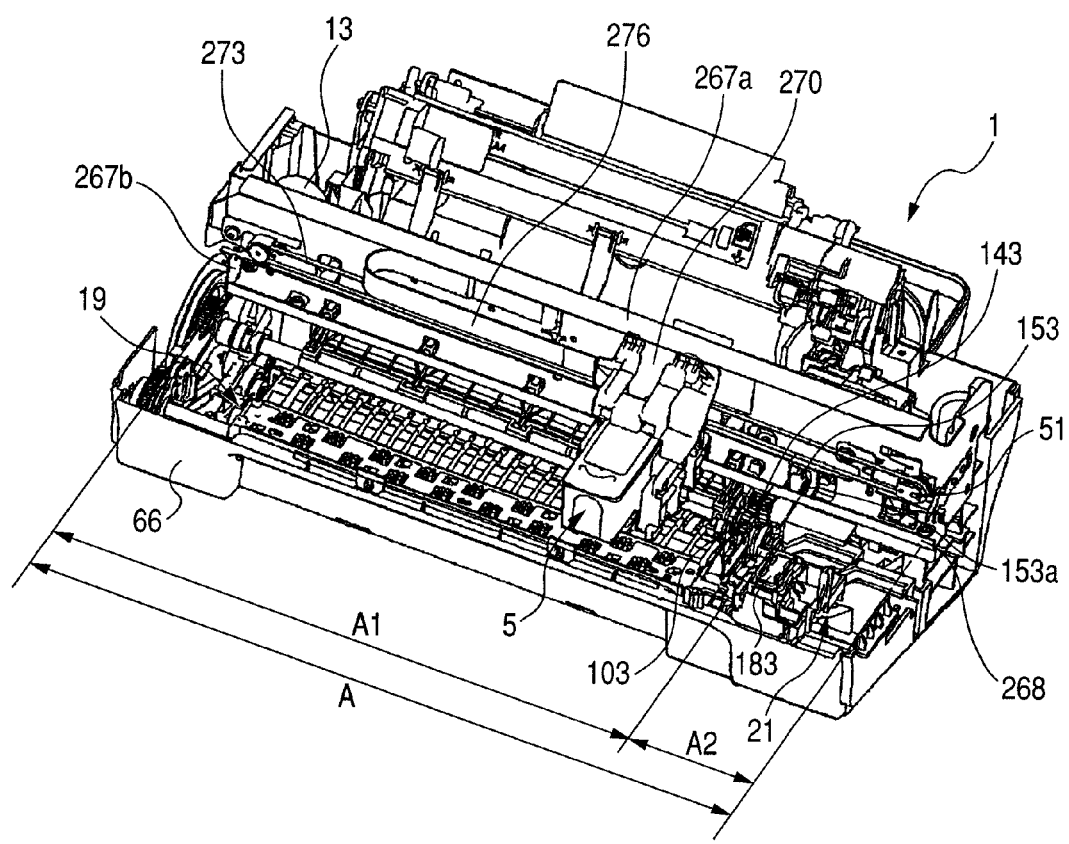
FIG. 2 is a perspective view of the image reading and recording apparatus.
Figure 3:
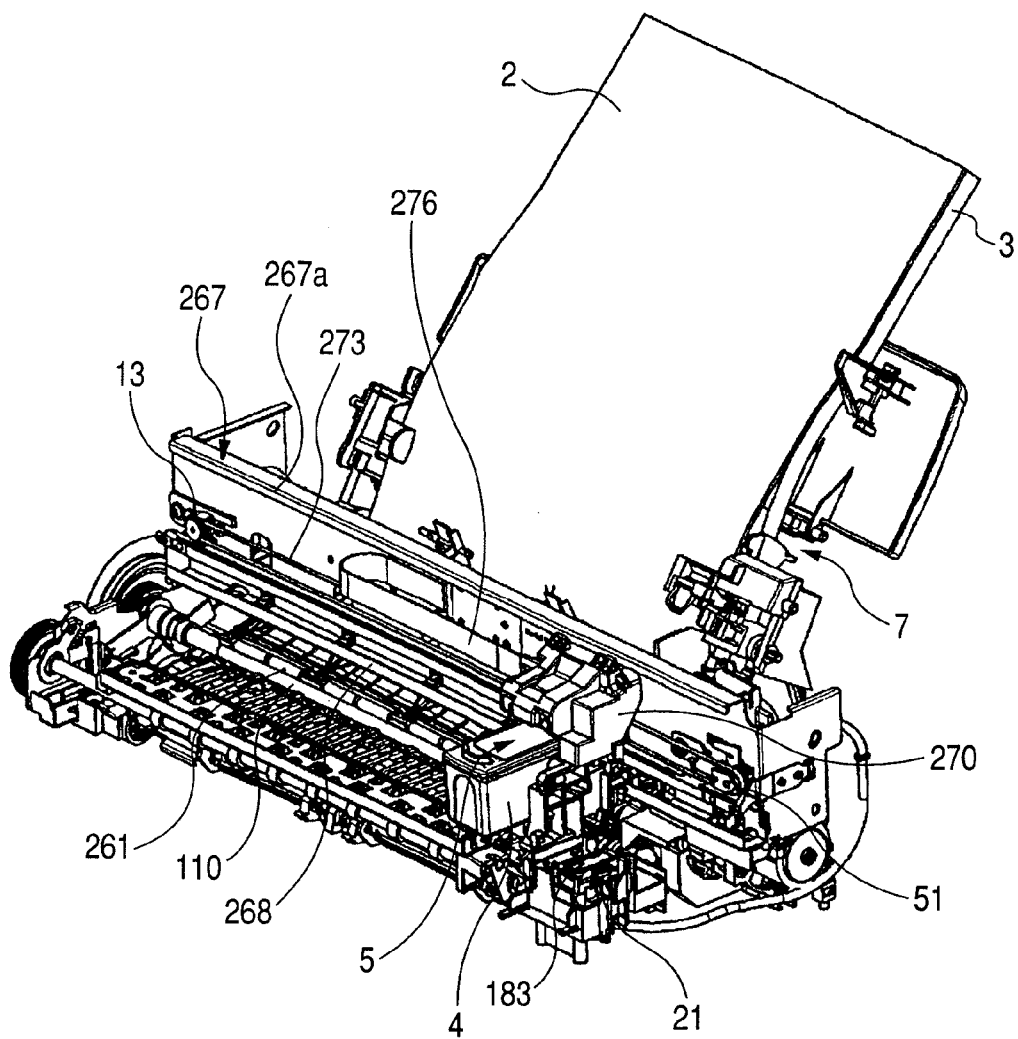
FIG. 3 is a perspective view of the image reading and recording apparatus in which an original document has been stacked.

An embodiment of the invention will be specifically described hereinbelow with reference to the drawings. The same or corresponding portions in all drawings are designated by the same reference numerals. FIG. 1 is a vertical sectional view illustrating a whole construction of an image reading and recording apparatus according to the embodiment of the invention. FIG. 2 is a perspective view of the image reading and recording apparatus. FIG. 3 is a perspective view of the image reading and recording apparatus in which an original document has been stacked. In FIGS. 1 to 3, an image reading and recording apparatus 1 has: a recording head 4 for recording onto recording paper; a reading unit 6 for reading the original; a sheet feeding unit 7; a sheet discharging unit 8; and a conveying unit 9. The sheet feeding unit 7 supplies the sheet-shaped recording paper and original. The sheet discharging unit 8 discharges the recording paper and the original. The conveying unit 9 conveys the recording paper and the original along a common conveying path.

The image reading and recording apparatus 1 has a carriage 270 on which the recording head 4 for recording by discharging ink onto the recording paper is mounted and which is reciprocated. A discharge recovery unit 21 is provided for maintaining and recovering ink discharging performance of the recording head 4. Switches which are used for the user to operate the apparatus and a display for displaying an operating state of the apparatus are provided for an operation panel 26.

Subsequently, the recording operation of the image reading and recording apparatus 1 will be described. Sheets of recording paper 3 stacked on a sheet stacking portion 14 of the sheet feeding unit 7 are fed out by a sheet feeder roller 155 and a pressing plate 148 which has been come into pressure contact with the sheet feeding roller 155. The fed sheets of recording paper are separated one by one by the sheet feeding roller 155 and a separating roller 172 and sent to a common conveying path 11. A conveying roller 110 for conveying the recording paper or the original is arranged on the common conveying path 11. The recording paper 3 passes through a recording unit which faces the recording head 4 and is conveyed toward a sheet discharging roller 112 of the sheet discharging unit 8 by the conveying roller 110 and pinch rollers 261 which have been come into pressure contact with the conveying roller 110.

At the time of the recording operation, a platen 231 is arranged at a position which faces the recording head 4. The recording paper 3 on which the image has been recorded by discharging the ink from the recording head 4 is ejected from the apparatus main body by the conveying roller 110 and sheet discharging roller 112 and stacked onto a tray or the like. As illustrated in FIG. 2, the discharge recovery unit 21 for normally maintaining the ink discharging performance of the recording head 4 is arranged on the right side in the diagram which lies within a moving range (range A in FIG. 2) of the carriage 270 and which is out of a recording area where the recording is executed to the recording paper.

Figure 4:
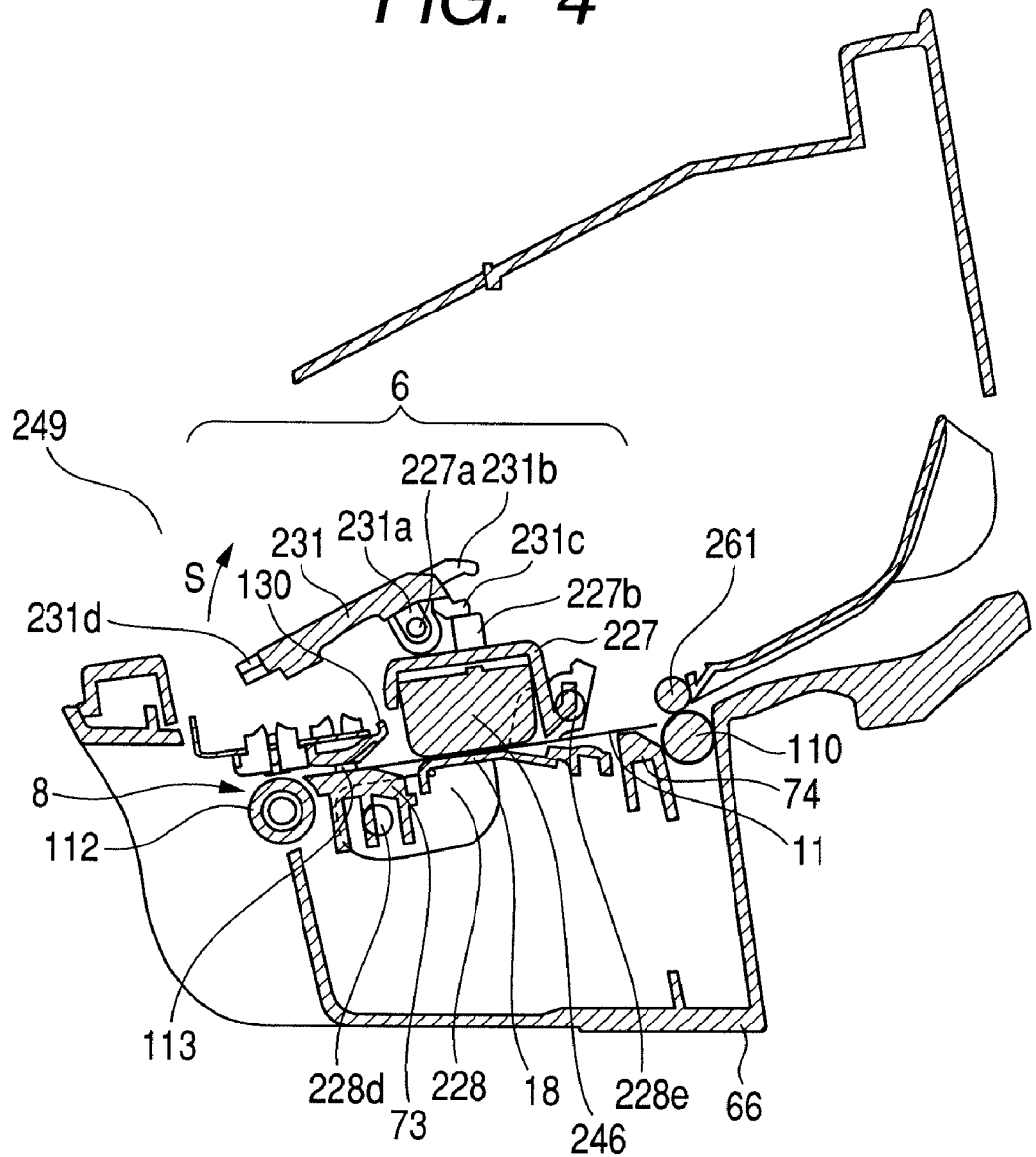
FIG. 4 is a vertical sectional view illustrating a peripheral portion of a reading unit at the time of the reading operation.
Figure 5:
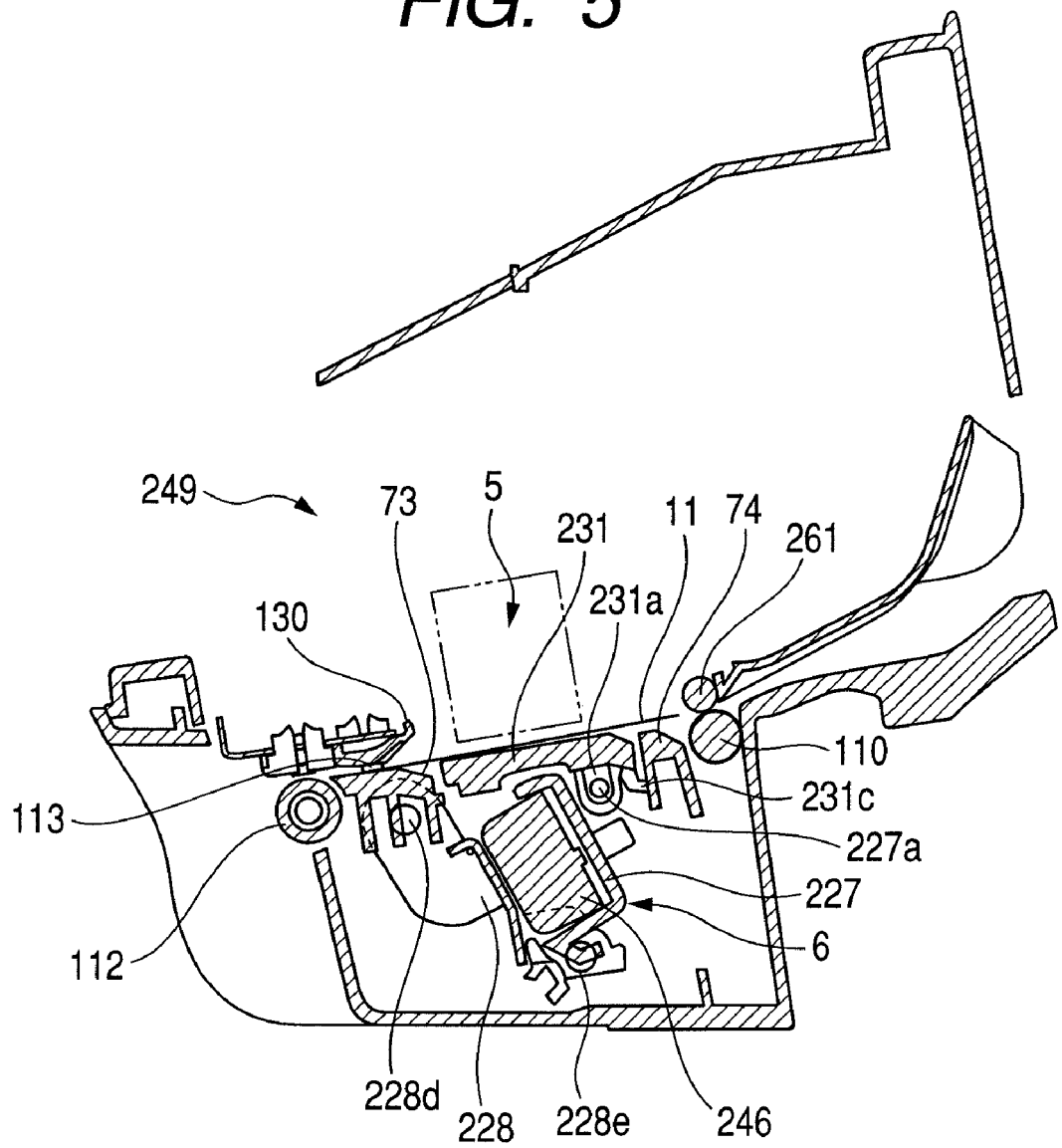
FIG. 5 is a vertical sectional view illustrating the peripheral portion of the reading unit at the time of the recording operation.

FIG. 4 is a vertical sectional view illustrating a peripheral portion of the reading unit 6 at the time of the reading operation. FIG. 5 is a vertical sectional view illustrating the peripheral portion of the reading unit 6 at the time of the recording operation. In a standby mode in which none of the recording operation and the reading operation is executed, the reading unit 6 for reading an original document 2 is also located on the upper side of the conveying path 11 in a manner similar to the case of the reading operation as illustrated in FIG. 4. When a recording command is generated by the operation or the like of the operation panel 26 in the same standby mode as that in FIG. 4, the reading unit 6 is moved to a retracting position on the lower side of the conveying path 11. After the reading unit 6 entered a state as illustrated in FIG. 5, the foregoing recording operation is started. When the recording operation is finished, the reading unit 6 is moved from the lower side to the upper side of the conveying path 11 and enters a state as illustrated in FIG. 4.

When the reading unit 6 is located on the upper side of the conveying path 11 or is moving, since the carriage 270 has been retracted to a position out of a sheet conveying area on the right side of the apparatus as illustrated in FIG. 2, it does not interfere with the reading unit 6. In the standby mode, the carriage 270 is located at a position which faces the discharge recovery unit 21. By allowing a cap 183 to be come into contact with a discharge port surface 4e of the recording head 4, deterioration in ink discharging performance is prevented. The cap is open in a range A1 and is closed in a range A2 as illustrated in FIG. 2.

Subsequently, the reading operation of the image reading and recording apparatus 1 will be described with reference to FIGS. 1 to 4. As illustrated in FIG. 4, in the standby mode, the reading unit 6 is positioned on the upper side of the conveying path 11. Therefore, when a reading command is generated by the operation or the like of the operation panel 26 by the user, the sheets of original 2 stacked in the sheet stacking portion 14 of the sheet feeding unit 7 are fed out by the sheet feeding roller 155 and the pressing plate 148. The fed original sheets are separated one by one by the sheet feeding roller 155 and the separating roller 172 in a manner similar to the case of the recording paper 3. After the original is sent to the conveying roller 110, the reading operation of the original 2 is executed by the reading unit 6 while the original 2 is conveyed along the conveying path 11 by the conveying roller 110 and the sheet discharging roller 112. After the reading operation is finished, the original 2 is ejected from the apparatus main body by the conveying roller 110 and the sheet discharging roller 112. During the reading operation, in the discharge recovery unit 21, the recording head 4 is maintained in a state where the cap 183 has closely been adhered.

Figure 6:
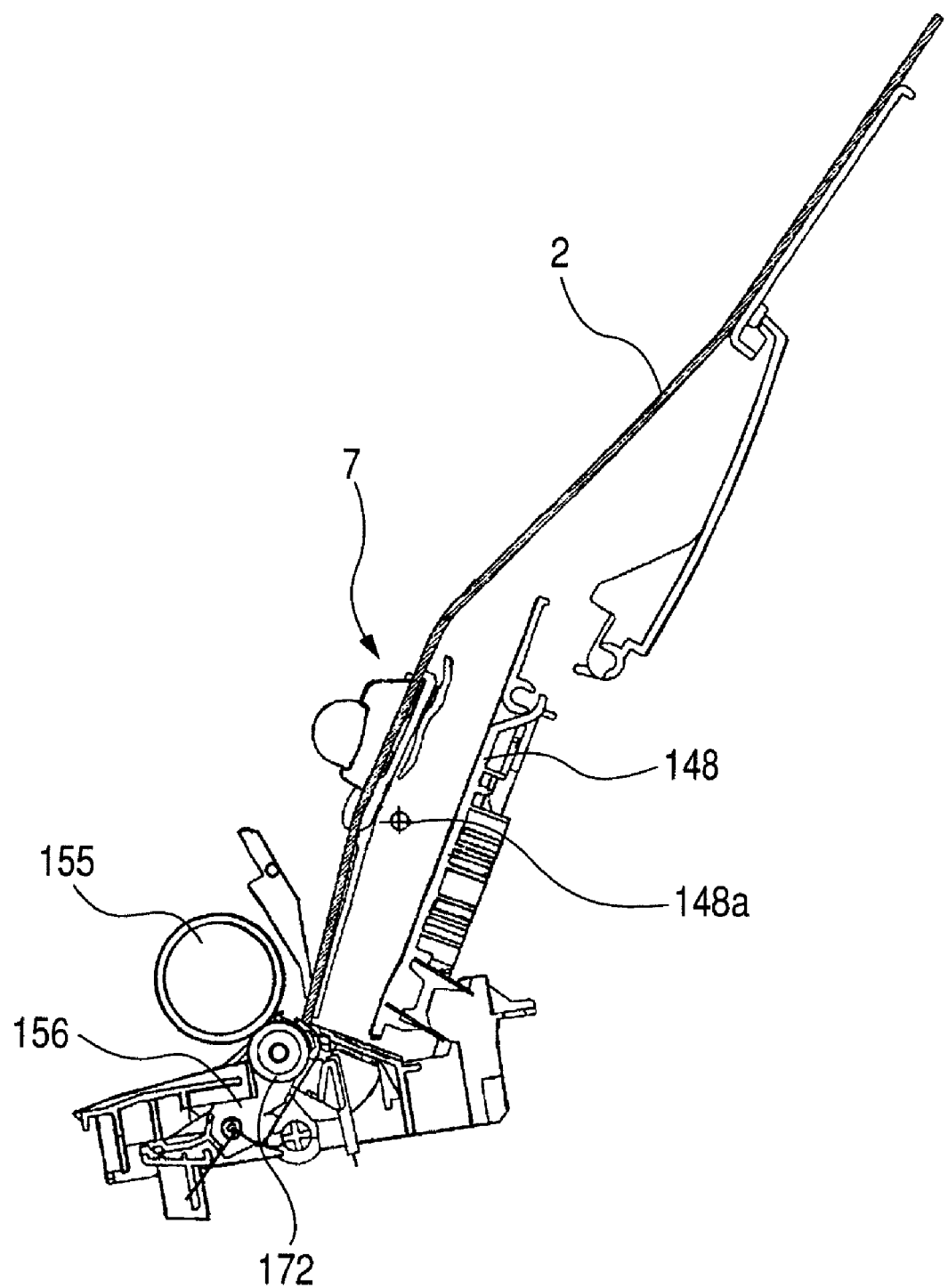
FIG. 6 is a vertical sectional view illustrating a state where the original has been set.
Figure 7:
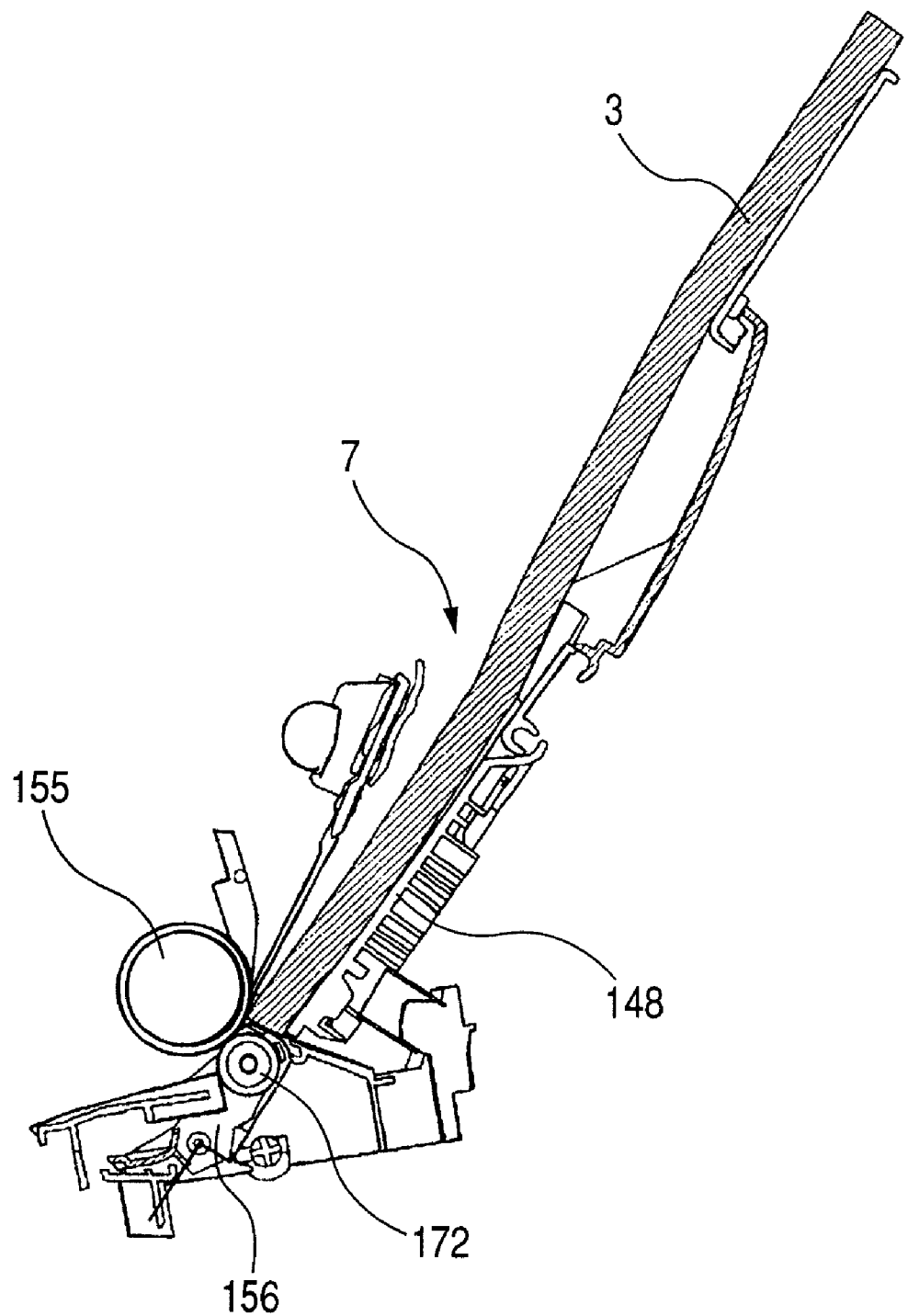
FIG. 7 is a vertical sectional view illustrating a state where recording paper has been set.

FIG. 6 is a vertical sectional view illustrating a state where the original 2 has been set into the image reading and recording apparatus 1. FIG. 7 is a vertical sectional view illustrating a state where the recording paper has been set into the image reading and recording apparatus 1. The sheet feeding unit 7 will now be described. The recording paper 3 or original 2 (hereinbelow, simply referred to as a sheet or sheets) is pressed onto the sheet feeding roller 155 by the operation of the pressing plate 148 at predetermined timing, so that the sheet feeding roller 155 are rotated. Thus, the top sheet which is in contact with the sheet feeding roller 155 is fed out by a frictional force of the sheet feeding roller 155. Since the sheet feeding roller 155 feed the sheet by the frictional force, rubber such as an EPDM having a high coefficient of friction, a urethane foam, or the like is used as a material of the sheet feeding roller 155. Generally, since the frictional force between the sheet feeding roller 155 and the sheet is larger than that between the sheets, only the top sheet is fed out by a rotation of the sheet feeding rollers. However, if there is a burr in an edge portion that is caused upon cutting of the sheet or there is a sticking between the sheets that is caused by static electricity, further, in the case of using sheets having a very large coefficient of friction, or the like, there is a case where a plurality of sheets are pulled out by the rotation of the sheet feeding roller 155.

When no sheet exists between the sheet feeding roller 155 and the separating roller 172, the separating roller 172 is driven-rotated by the rotation of the sheet feeding roller 155. When one sheet enters between the sheet feeding roller 155 and the separating roller 172, the frictional force between the sheet feeding roller 155 and the sheet is larger than that between the separating roller 172 which is driven-rotated by a predetermined torque and the sheet. Therefore, the sheet is fed out while allowing the separating roller 172 to be driven-rotated. However, if two sheets enter between the sheet feeding roller 155 and the separating roller 172, since the frictional force between the sheet feeding roller 155 and the sheet is larger than that between the sheets and the frictional force between the separating roller and the sheet is also larger than that between the sheets, a slip occurs between the sheets.

If a plurality of (three or more) sheets enter between the sheet feeding roller 155 and the separating roller 172, there is a possibility of the occurrence of a sheet overlap feeding in which a plurality of sheets are simultaneously fed out. To prevent such a situation, a return lever 150 (FIG. 8) is arranged on a sheet passing path near the sheet feeding roller 155. The return lever 150 is located at a position where a sheet passing path is closed in the standby mode. After the sheet feeding is started, the return lever 150 is rotated to the retracting position, thereby releasing the sheet passing path. When the separating operation is finished, the return lever 150 is rotated so that the second and subsequent sheets existing in a nip portion between the sheet feeding rollers and the separating roller are returned to the sheet stacking portion. After the sheet returning operation is finished, the return lever 150 is rotated to a position where it is retracted from the sheet passing path. When a rear edge of the sheet reaches the downstream side of the conveying direction from a predetermined position, the return lever is again returned to the original position of the standby mode.

Figure 8:
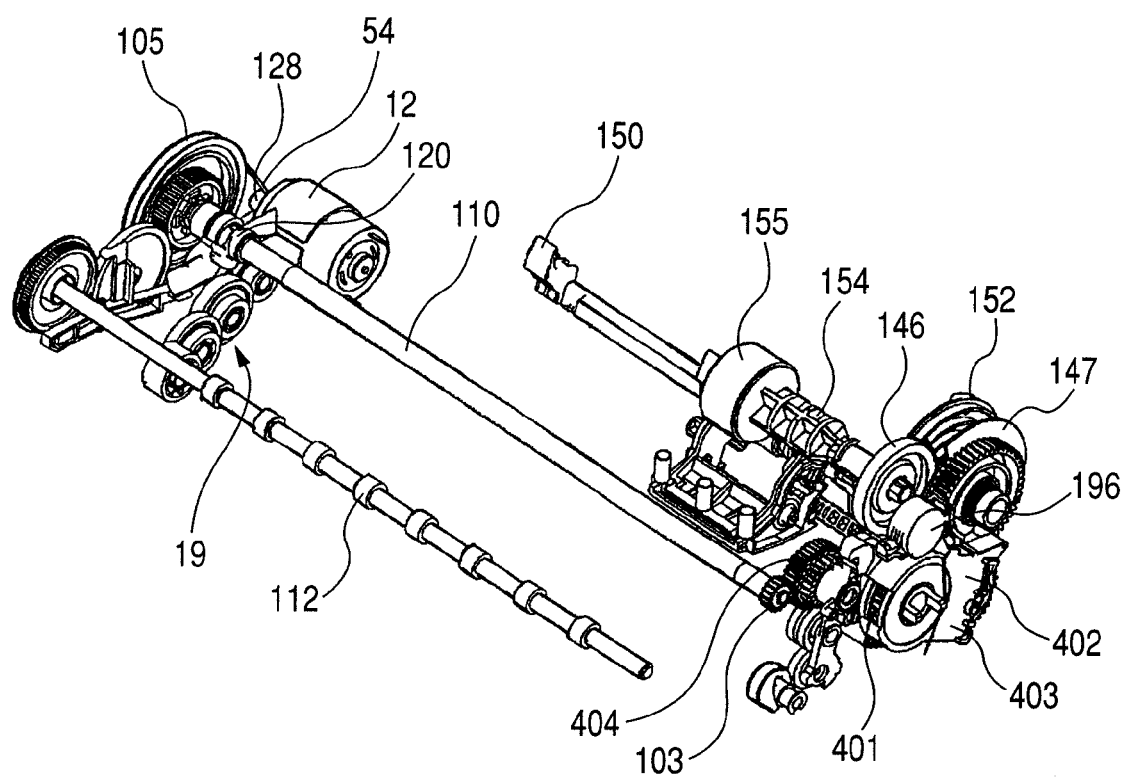
FIG. 8 is a perspective view illustrating a drive transmitting unit for transferring the driving of a conveying motor to a conveying roller and a sheet feeding unit.
Figure 9A:
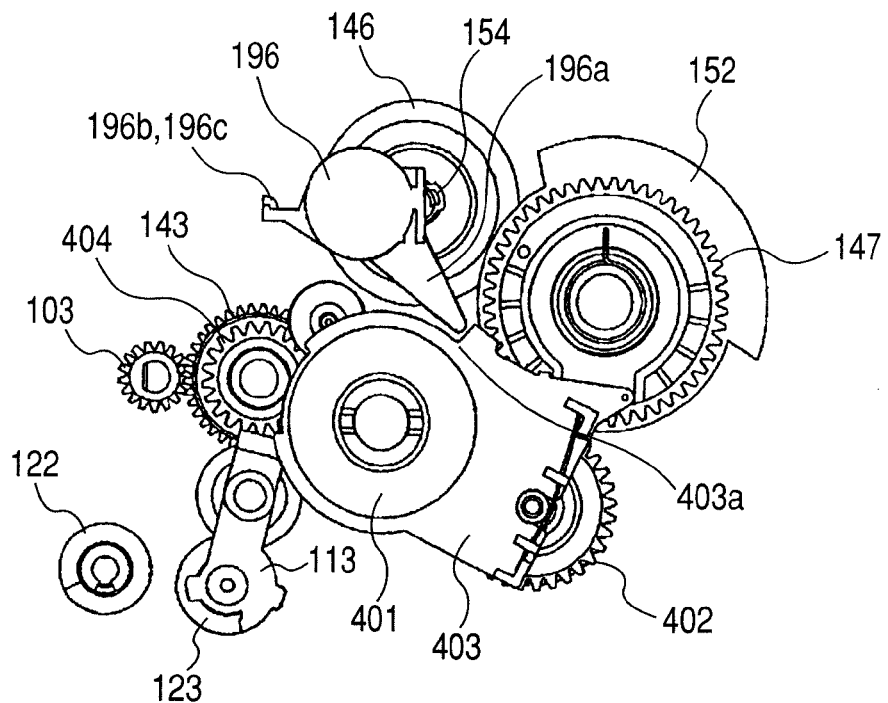
Figure 9B:
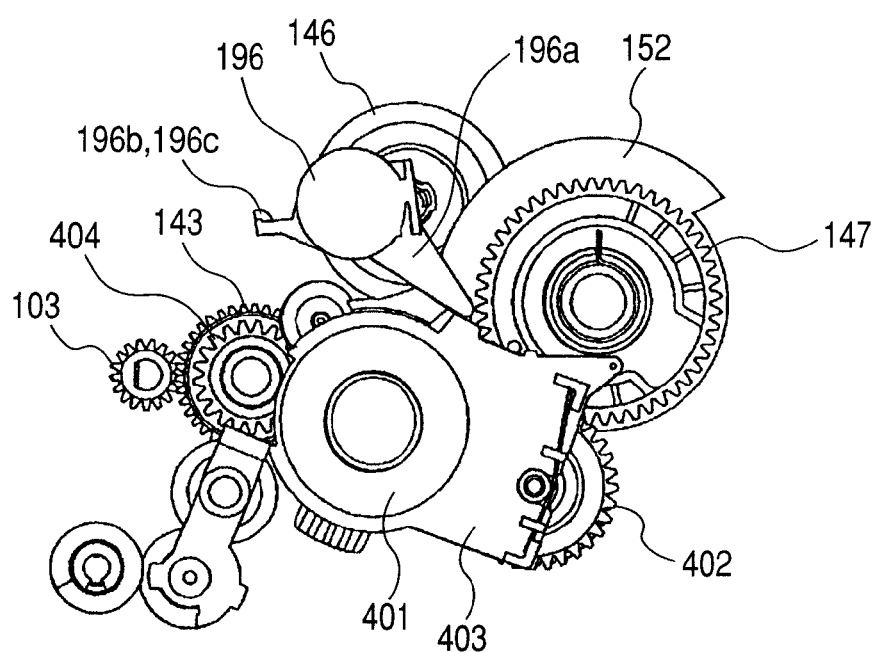

The image reading and recording apparatus 1 is constructed in such a manner that the sheet feeding unit 7 and the discharge recovery unit 21 can be driven by a conveying motor for driving the conveying roller 110. FIG. 8 is a perspective view illustrating a construction of a drive transmitting unit for transferring the driving of a conveying motor 12 to the conveying roller 110 and the sheet feeding unit 7. FIGS. 9A and 9B are partial front views illustrating the construction of the drive transmitting unit for transferring the driving from the conveying roller to the sheet feeding unit, in which FIG. 9A illustrates a state where the driving force to the sheet feeding unit has been disconnected and FIG. 9B illustrates a state where the driving can be transferred to the sheet feeding unit. The conveying motor 12, the conveying roller 110, a driving pulley 128, a conveying roller pulley 105, and a conveyance output gear 103 are illustrated in FIGS. 8, 9A, and 9B. An idle gear 404, a sun gear 401, a planetary gear 402, a planetary arm 403, a sheet feeding axial gear 146, a sheet feeding axis 154, and the sheet feeding roller 155 are also illustrated. The driving which is output from the driving pulley 128 of the conveying motor 12 is propagated to the conveying roller 110 through a belt 54 and the conveying roller pulley 105. A driving force of the conveying roller 110 is propagated to the planetary gear 402 through the conveyance output gear 103, the idle gear 404, and the sun gear 401.

In FIGS. 8, 9A, and 9B, a trigger arm 196 for selectively intermitting the driving to the sheet feeding unit 7 is provided. The trigger arm 196 is rotatably and axially supported and is urged clockwise in FIGS. 9A and 9B by a spring (not shown). The sun gear 401 and the planetary gear 402 are axially supported on the planetary arm 403 and are come into engagement with each other. A friction is applied to the rotation of the planetary gear 402 and the planetary arm 403 is rotated (swung) around the sun gear 401 as a rotational center according to the rotation of the sun gear 401. The drive transfer from the planetary gear 402 to the sheet feeding axial gear 146 can be intermitted (disconnected, connected) by using the swinging operation. In the embodiment, the driving is selectively intermitted by restricting the swinging operation of the planetary arm 403 by the trigger arm 196.

In the state where the driving is not transferred to the sheet feeding unit illustrated in FIG. 9A (standby mode), an arm portion 196a of the trigger arm 196 is located at a position where it has been rotated clockwise by the spring urging operation and is in engagement with a concave portion 403a of the planetary arm 403. When the conveying roller 110 (conveyance output gear 103) is forwardly rotated (counterclockwise in the diagram), the sun gear 401 rotates counterclockwise. Therefore, the planetary arm 403 including the planetary gear 402 also intends to rotate counterclockwise. However, this rotation is blocked by the arm portion 196a of the trigger arm 196. Thus, the driving is not transferred to a control gear 147. When the conveying roller 110 (conveyance output gear 103) is reversely rotated (clockwise), the motion of the planetary arm 403 is also similarly blocked by the arm portion 196a of the trigger arm 196. That is, in the standby mode illustrated in FIG. 9A, since the planetary arm 403 does not move counterclockwise, the driving is not transferred to the sheet feeding unit 7 in both of the forward rotation and the reverse rotation of the conveying roller 110.

In the state illustrated in FIG. 9B, since the trigger arm 196 is depressed by a first lever portion 196b or a second lever portion 196c, the trigger arm 196 is rotated counterclockwise in the diagram against the spring urging force. Thus, the arm portion 196a of the trigger arm 196 is separated from the concave portion 403a of the planetary arm 403 and the trigger arm 196 is in a releasing state. When the conveying roller 110 is forwardly rotated in the state of FIG. 9B, the sun gear 401 rotates counterclockwise and the planetary arm 403 also rotates counterclockwise. Thus, the planetary gear 402 is come into engagement with the control gear 147. Since the control gear 147 is in engagement with the sheet feeding axis 146, the forward rotation of the conveying roller 110 is transferred to the sheet feeding roller 155 through the sheet feeding axial gear 146 and the sheet feeding axis 154 and the sheet feeding rollers rotate clockwise in the diagram.

A one-way clutch for preventing a control cam 152 from rotating clockwise in the diagram has been assembled in the control cam 152. This is because it is intended to prevent the sheet feeding roller 155 from being reversely rotated when the conveying roller 110 is reversely rotated during the sheet feeding operation in order to correct a skew of the sheet (particularly, recording paper) 3. The planetary gear 402 is constructed by two coaxial gears. A clutch mechanism is provided between the two gears in such a direction that the driving is transferred when the conveying roller 110 is forwardly rotated and the driving is not transferred when the conveying roller 110 is reversely rotated. By using such a fixing mechanism of the planetary arm 403, there is such an advantage that since the carriage can be located at an arbitrary position after the trigger is performed by the trigger arm 196, another operation can be also executed during such an interval.

A reading and driving sun gear 120 is arranged on an axis of the conveying roller 110. The reading and driving sun gear 120 transfers a driving force to a reading switching unit 19 for rotating the reading unit 6 between the reading position and the retracting position and is arranged between a conveying roller pulley and the sheet conveying area.

Figure 10:
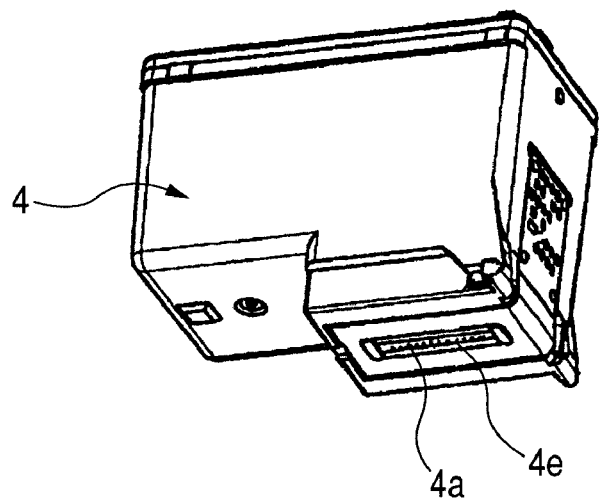
FIG. 10 is a perspective view illustrating a state where a recording head in FIG. 1 is seen from an oblique downward position.

FIG. 10 is a perspective view illustrating a state where the recording head 4 is seen from an oblique downward position. The recording head 4 is of a cartridge type in which the recording head 4 has been integrated with an ink tank. The discharge port surface 4e in which a plurality of discharge ports 4a have been formed in a predetermined layout is formed in a lower surface of the recording head 4.

Figure 11:
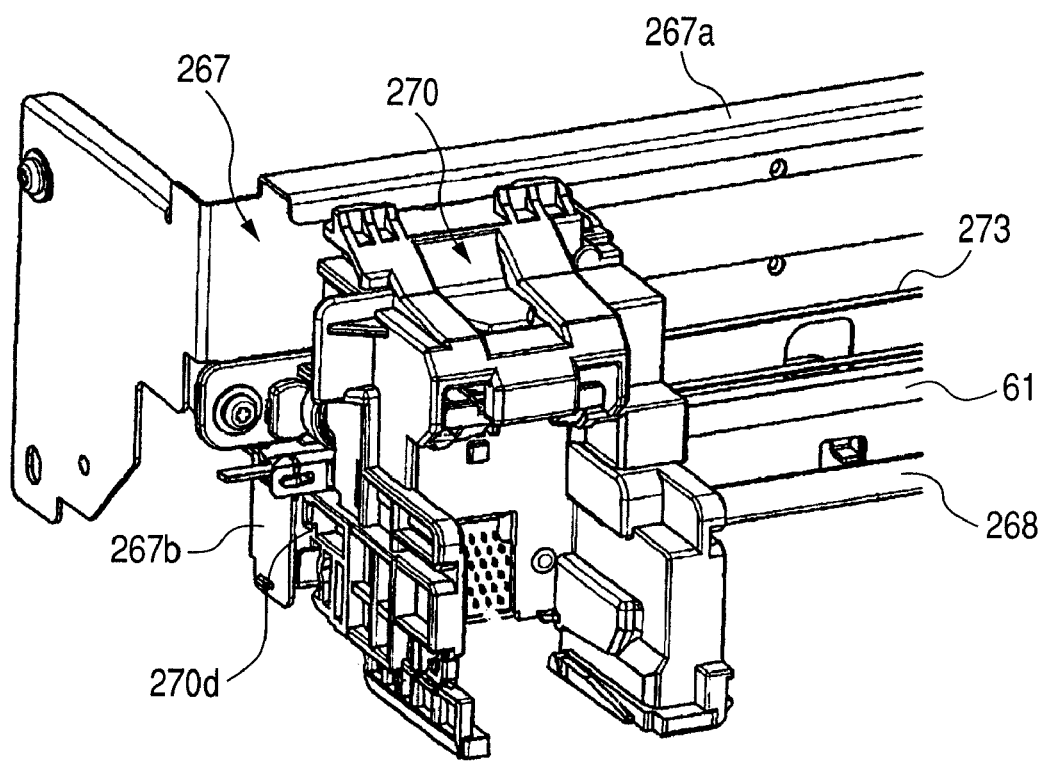
FIG. 11 is a perspective view illustrating a state where a carriage is located at a reference position upon recording operation provided in a left side edge portion of an apparatus main body.

FIG. 11 is a perspective view illustrating a state where the carriage is located at a reference position upon recording operation provided in a left side edge portion of the apparatus main body. The carriage 270 is driven by a carriage motor (not shown) through a timing belt 273 suspended between a driving pulley and an idler pulley. A code strip 61 adapted to detect the position of the carriage is suspended in parallel with a moving path of the carriage 270. The reference position illustrated in FIG. 11 is also used as a maintenance position adapted to exchange the recording head 4. The reference position deciding operation at the time of the recording operation is executed by a method whereby a bumping portion 270d provided for the carriage 270 is bumped against a bumping portion 267b provided in a left side edge portion of a chassis 267.

The carriage 270 is guided and supported by a chassis rail 268 provided for the chassis 267 and a supporting rail 267a as a part of the chassis 267. When the driving of a carriage motor 13 is transferred to the carriage 270 through the carriage belt 273 suspended between the driving pulley and the idler pulley 51, the carriage 270 is reciprocated. A signal from a head driver of an electric circuit board is transmitted to the recording head 4 through a flexible flat cable 276. When the recording command is generated, the reading unit 6 is retracted to the lower side of the common conveying path 11. Thus, the carriage 270 can be moved to the right and left along the chassis rail 268. By discharging the ink from the discharge ports 4a based on image information, an image is recorded onto the recording paper 3.

The code strip 61 is suspended in parallel with the chassis rail 268. By reading the code strip 61 by an encoder built in the carriage 270, the ink can be discharged onto the recording paper at proper timing.

In FIGS. 4 and 5, in the reading mode, the reading unit 6 is arranged between the conveying roller 110 and the sheet discharging roller 112 along the moving path of the carriage 270. In the reading mode, a reading sensor 246 composed of a contact image sensor is arranged on the upper side of the conveying path 11 and reads an upper surface of the original which is conveyed. The sheet feeding roller 155 for separating and conveying the sheets of original or recording paper one by one is also arranged on the upper side of the original and the recording paper. Thus, the sheets of original are sequentially conveyed from the first page in a state where the original surface faces up and can be read in correct page order.

The reading unit 6 has: the reading sensor 246; a sensor holder 227 for holding the reading sensor 246; and a white reference member 228. The platen 231 for guiding and supporting the recording paper 3 which is conveyed in the recording operation is rotatably attached to the sensor holder 227. The sensor holder 227 is rotatably held to the white reference member 228. In the normal posture, a reading portion 18 constructed by a sheet passing gap is formed between the reading sensor 246 and the white reference member 228. The reading unit 6 is attached so as to be rotatable around a hole 228d of the white reference member as a rotational center. While the original is being conveyed in the sheet passing gap, the original is conveyed while being urged onto the surface of the white reference member by the conveying roller, sheet discharging roller, and a depressing spur 113. The depressing spur 113 is provided to reduce such a situation that when a rear edge of the original has come out of the conveying roller, an urging force of the rear edge portion of the original is extinguished and the original floats up. Thus, since the original passes stably through the sheet passing gap while being urged onto the lower surface of the sheet passing gap during the original reading operation, the image can be desirably read.

Figure 12:
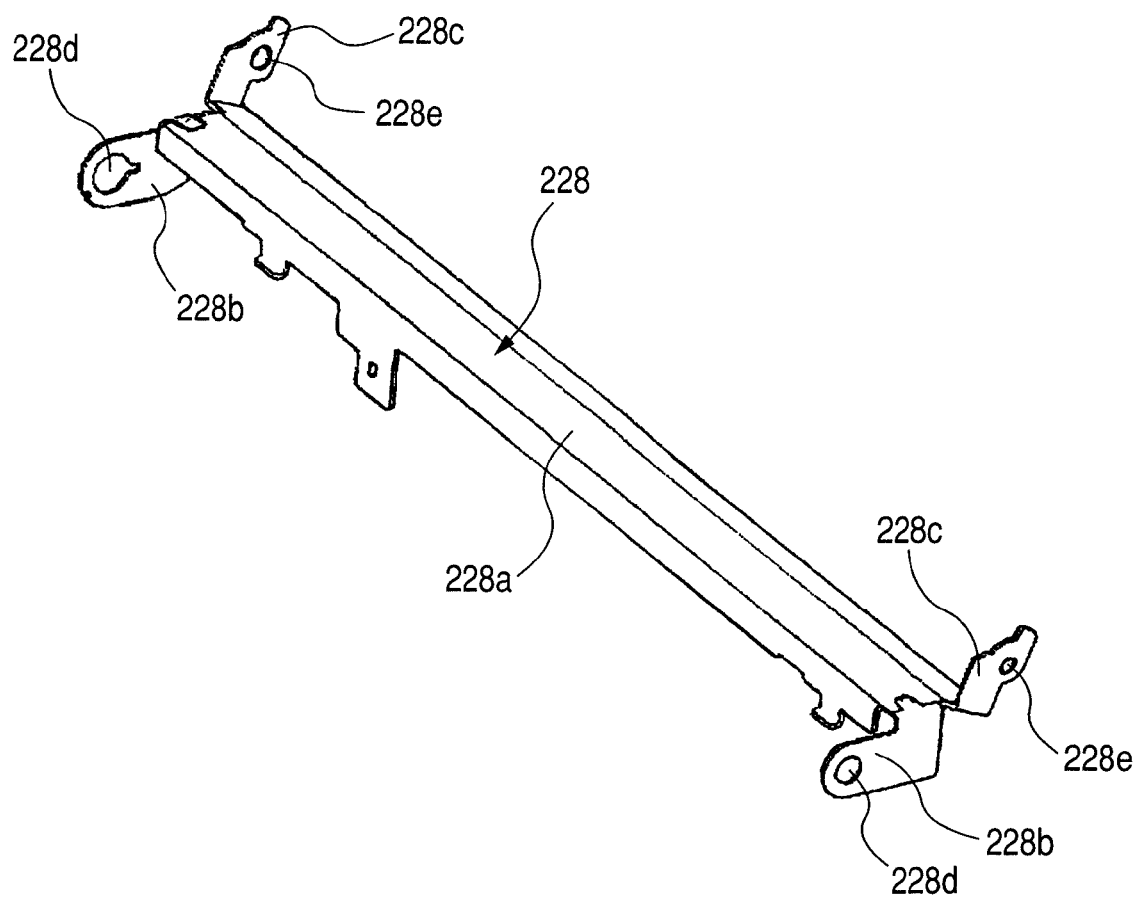
FIG. 12 is a perspective view of a white reference member of the reading unit.

FIG. 12 is a perspective view of the white reference member 228. The white reference member 228 is constructed by: a flat portion 228a formed by attaching a white sheet onto a metal plate; and bending portions 228b and 228c formed in each of both edge portions in the longitudinal direction. The two holes 228d are formed in the bending portions 228b so as to be mutually coaxial. Two holes 228e are formed in the bending portions 228c so as to be mutually coaxial.

The holes 228d are rotatably and axially supported to an axial portion (not shown) formed on a base 66 (apparatus main body). The reading unit 6 is rotatably attached to the apparatus main body around each hole 228d of the white reference member as a rotational center. By executing the movement of the reading unit 6 by the rotating operation, for example, as compared with the parallel movement or the like, the guide member for restricting the position becomes unnecessary or the like. Therefore, the precise moving operation of the reading unit 6 is realized by a simple construction. The white reference member 228 and the sensor holder 227 are rotatably coupled through the holes 228e.

Figure 13:
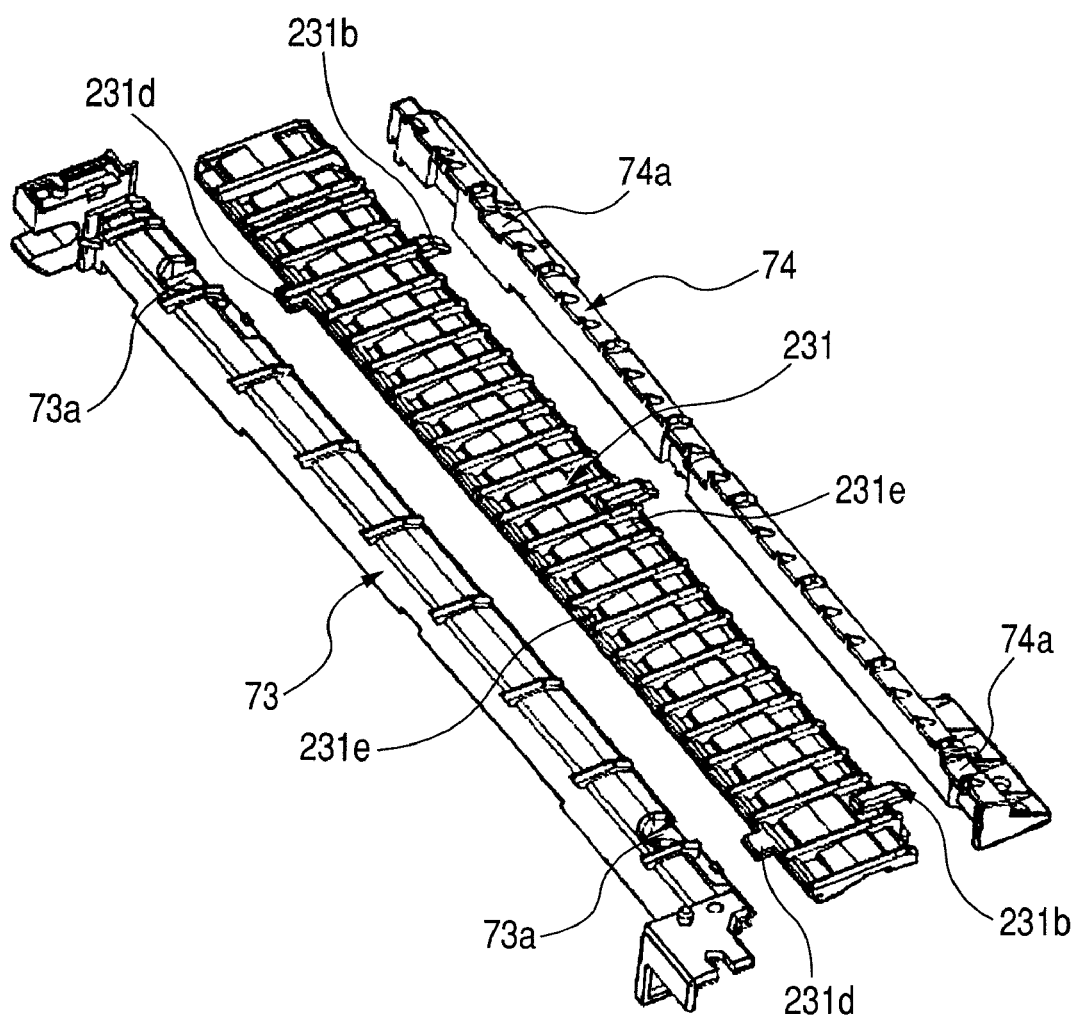
FIG. 13 is a perspective view of a platen and guide members.

FIG. 13 is a perspective view of the platen 231 and guide members 73 and 74. FIG. 13 illustrates a relation among the platen 231, the downstream side guide member 73 and the upstream side guide member 74, when the platen 231 is located on the lower side of the conveying path 11 in the recording mode and. A hole portion 231a, first projecting portions 231b, and second projecting portions 231c are formed in the platen 231 on the upstream side when seen from the recording paper conveying direction and downstream side projecting portions 231d are formed on the downstream side. The hole portion 231a of the platen is in engagement with an axial portion 227a formed in the sensor holder 227. The platen 231 is attached to the sensor holder 227 so as to be rotatable around the axial portion 227a as a rotational center. The first projecting portion 231b of the platen 231 can be come into contact with concave portions 74a of the upstream side guide member 74. The downstream side projecting portions 231d of the platen can be come into contact with concave portions 73a of the downstream side guide member 73.

When the reading unit 6 rotates around each hole 228d as a rotational center, if the relative positions of the reading sensor 246 and the platen 231 are rotated while keeping the posture of the recording position in FIG. 5, there is a fear that the downstream side portion of the platen 231 in the conveying direction interferes with a gear base 130 existing over the downstream side guide member 73. To avoid such an interference, the platen 231 is rotatable around the axial portion 227a of the sensor holder 227 as a rotational center. Further, the platen 231 is urged clockwise (direction shown by an arrow S) in FIG. 4 by a platen spring (not shown) attached to the axial portion 227a. Therefore, a projecting portion 227b is provided on the side opposite to the sensor surface of the sensor holder 227. Consequently, since the second projecting portion 231c on the upstream side is come into contact with the projecting portion 227b, the platen 231 is held in the position and posture as illustrated in FIG. 4 against the spring urging force of the platen spring.

Figure 14:
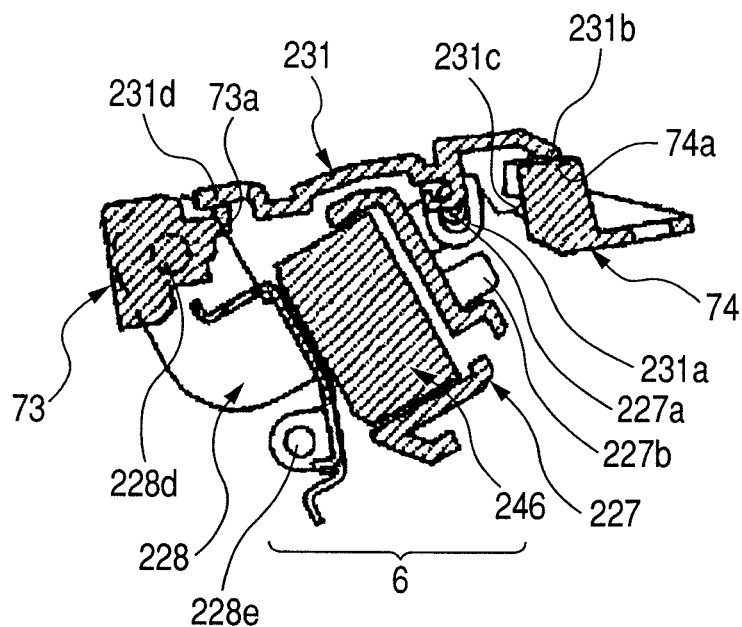
FIG. 14 is a partial vertical sectional view illustrating a state of the platen when the reading unit is located at a recording position.
Figure 15:
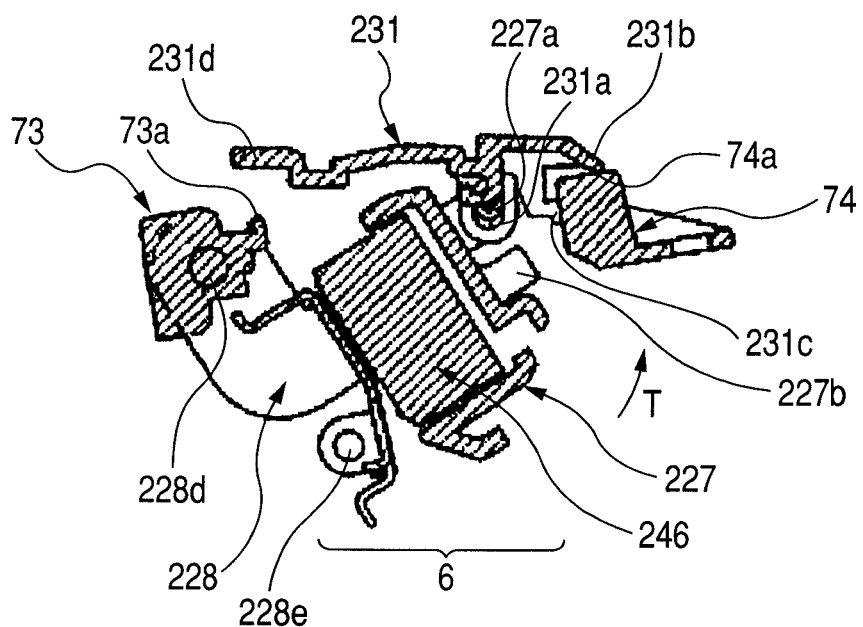
FIG. 15 is a partial vertical sectional view illustrating a state where the platen has slightly been moved while the reading unit is rotated from the recording position to a reading position.
Figure 16:
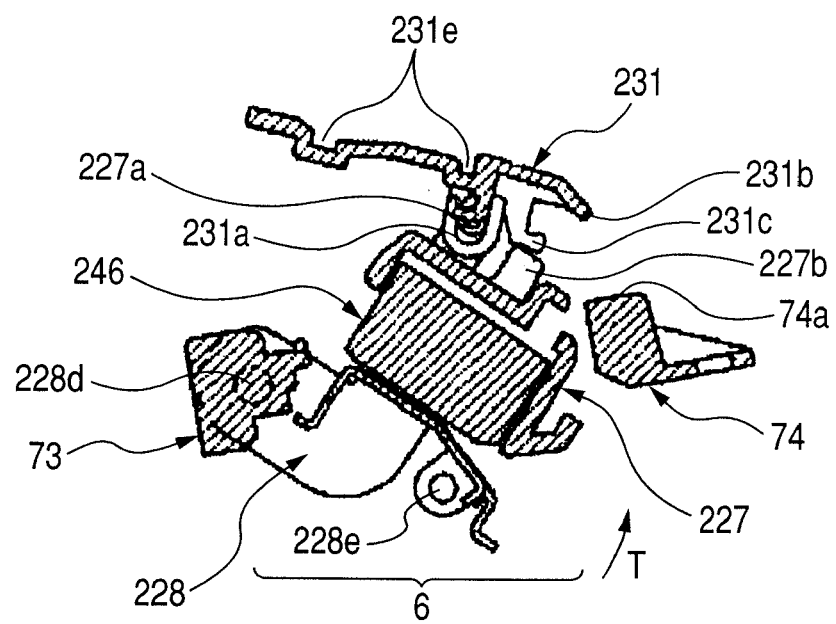
FIG. 16 is a partial vertical sectional view illustrating a state where the platen has been further rotated while the reading unit is rotated from the recording position to the reading position.
Figure 17:
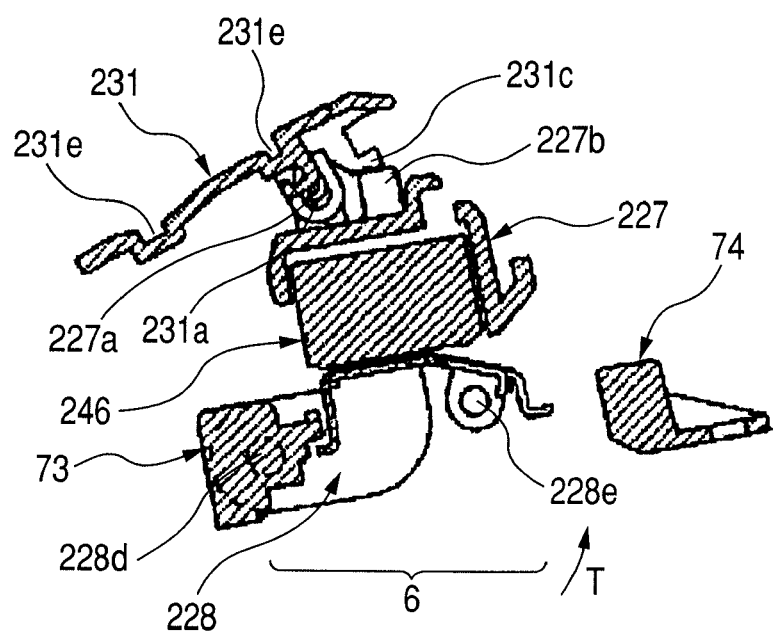
FIG. 17 is a partial vertical sectional view illustrating a state where the reading unit has been moved to the reading position.

FIGS. 14 to 17 illustrate the motion of the platen 231 which is executed while the reading unit 6 moves (rotates) from the recording position in FIG. 5 to the reading position in FIG. 4. FIG. 14 is a partial vertical sectional view illustrating a state of the platen when the reading unit is located at the recording position. FIG. 15 is a partial vertical sectional view illustrating a state where the platen has slightly been moved while the reading unit is rotated from the recording position to the reading position. FIG. 16 is a partial vertical sectional view illustrating a state where the platen has been further rotated while the reading unit is rotated from the recording position to the reading position. FIG. 17 is a partial vertical sectional view illustrating a state where the reading unit has been moved to the reading position.

At the recording position in FIG. 14, the first projecting portion 231b on the upstream side of the platen 231 is come into contact with the concave portion 74a of the upstream side guide member 74 and the downstream side projecting portion 231d of the platen 231 is come into contact with the concave portion 73a of the downstream side guide member 73. The posture of the platen 231 is determined by the upstream side guide member 74 and the downstream side guide member 73. The second projecting portion 231c on the upstream side of the platen 231 has been separated from the projecting portion 227b of the sensor holder 227.

At the position in FIG. 15, the downstream side projecting portion 231d of the platen 231 is separated from the concave portion 73a of the downstream side guide member 73 by the rotation of the reading unit 6 in the direction shown by an arrow T. However, the first projecting portion 231b is held in the state where it is in contact with the concave portion 74a of the upstream side guide member 74 by the clockwise spring urging force of the platen spring (not shown). Owing to such a construction, an interference between a portion near the downstream side edge portion of the platen 231 and the gear base 130 locating over the downstream side guide member 73 does not occur. The gear base 130 is a member for rotatably holding the gear which is come into pressure contact with the sheet discharging roller 112.

At the position in FIG. 16, the projecting portion 227b of the sensor holder 227 is come into contact with the second projecting portion 231c of the platen 231. Thus, the first projecting portion 231b of the platen 231 is separated from the concave portion 74a of the upstream side guide member 74. When the reading unit 6 further rotates in the direction of the arrow T, the second projecting portion 231c of the platen 231 moves in the state where the second projecting portion 231c of the platen 231 is in contact with the projecting portion 227b of the sensor holder 227. By rotating in such a state, the reading unit 6 reaches the reading position illustrated in FIG. 17.

As described with reference to FIGS. 14 to 17, since the platen 231 has rotatably been coupled with the reading sensor 246 (sensor holder 227), the platen 231 and the sensor holder 227 move independently for the rotation of the reading unit 6. Consequently, the reading unit 6 can be moved between the recording position and the reading position by the compact construction without interfering with the peripheral parts.

When the reading unit 6 is moved from the recording position to the reading position, an angle change of the platen 231 is fairly smaller than that of the sensor holder 227. Therefore, the platen 231 is held to a posture close to a horizontal state not only at the reading position, but also both at the recording position and during the movement. This is because the platen 231 has been urged by the platen urging spring (not shown) in the direction opposite to the rotating direction of the reading unit 6 from the recording position to the reading position.

By the above construction, even if the ink has been spilled on the upper surface of the platen in the recording operation, it is possible to prevent or suppress the ink from being spilled into the apparatus due to the subsequent rotation of the reading unit 6. The spill of the ink can be also suppressed by a plurality of concave portions 231e formed on upper surface of the platen 231.

Figure 18:
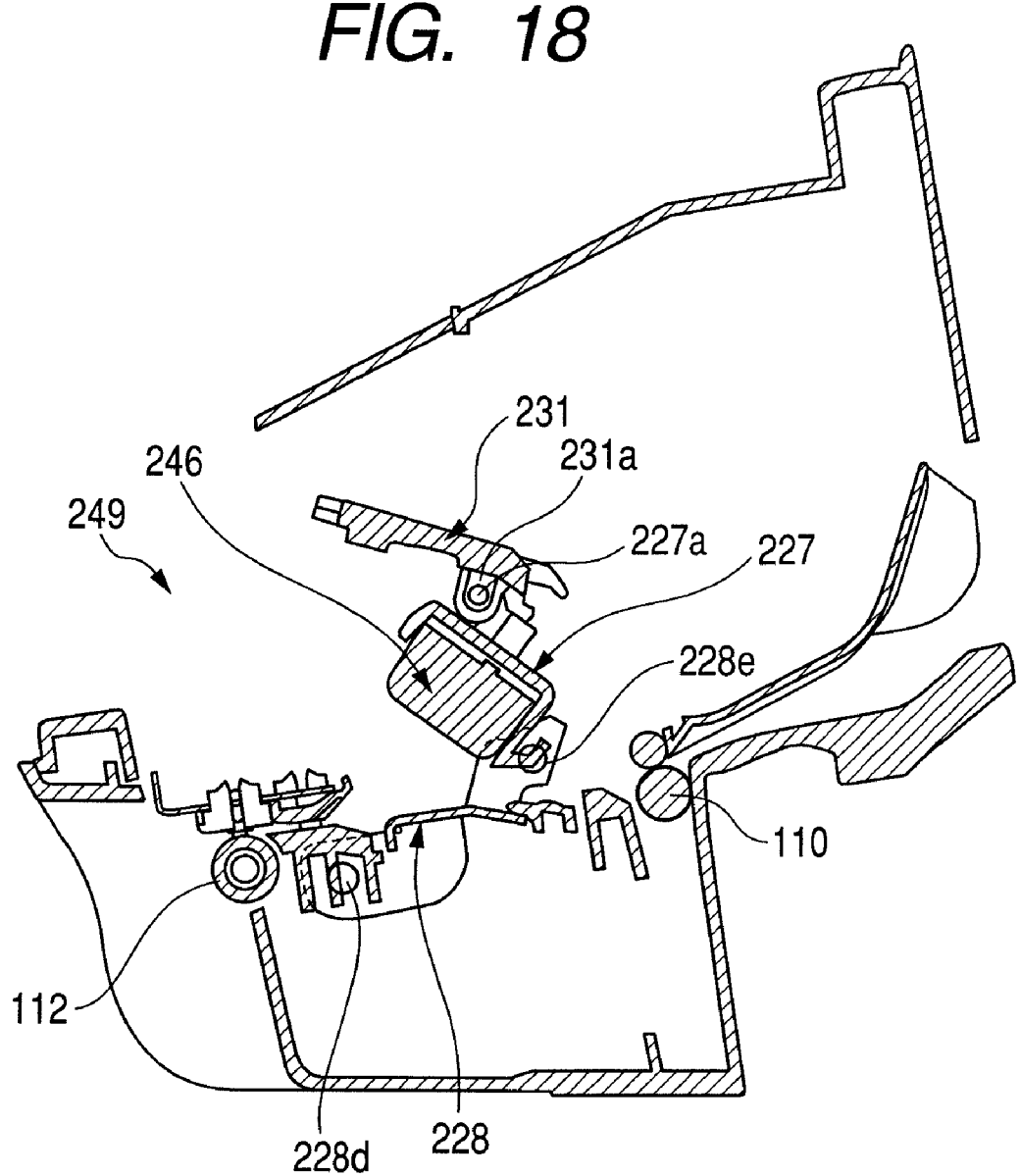
FIG. 18 is a vertical sectional view illustrating a state where the reading unit and the platen are cleaned.

FIG. 18 is a vertical sectional view illustrating a state where the reading unit and the platen are cleaned. Since there is a case where the dust, ink, or the like is adhered onto the reading unit 6 and the platen 231, it is desirable for the user to properly clean them. Subsequently, the state where the reading sensor 246, white reference member 228, and platen 231 are cleaned will be described. As mentioned above, the reading sensor 246 and the sensor holder 227 can rotate around each hole 228e of the white reference member 228 as a rotational center.

The reading sensor 246 and the sensor holder 227 have been urged toward the white reference member 228 side by the spring (not shown). A gap where one sheet of original can pass through has been formed between the reading sensor and the white reference member. The reading sensor 246 can be rotated in such a direction as to be separated from the white reference member 228 against the urging force of the spring. One of the white sheet of the white reference member 228 and the reading surface of the reading sensor 246 can be cleaned.

The hole 228d in the white reference member 228 which serves as a rotational center, is arranged near the downstream side edge portion of the white reference member 228 in the sheet conveying direction. Therefore, at the reading position, the platen 231 is moved to the downstream side in the sheet conveying direction from the recording position and located near an opening portion 249 in front of the apparatus main body. Owing to such a construction, the platen 231 can be easily cleaned from the opening portion 249.

The hole 228e in the white reference member 228, which serves as a rotational center adapted to rotate the reading sensor 246, is arranged near the upstream side edge portion of the white reference member 228 in the sheet conveying direction. Owing to such a construction, the reading surface of the reading sensor 246 and the white surface of the white reference member 228 can be easily cleaned.

Since the hole 228e adapted to rotate the reading sensor 246 for the white reference member 228 is arranged on the upstream side of the reading unit 6 in the sheet conveying direction, the gap between the reading surface of the reading sensor and the white sheet of the white reference member can be precisely maintained.

The movement of the reading unit 6 between the recording position and the reading position as described above is performed by using the driving of the conveying roller 110. By switching the driving of the conveying roller 110 when the carriage 270 is come into contact with the reading switching unit 19, the reading unit 6 is moved.

According to the embodiments of the invention, in the image reading and recording apparatus in which the conveying path of the original and that of recording paper are used as a common path, the image reading and recording apparatus in which the apparatus main body can be miniaturized while maintaining the recording precision and the reading precision can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-353984, filed Dec. 28, 2006, which is hereby incorporated by reference herein in its entirety.

What is claimed is:

1. An image reading and recording apparatus comprising:
   a carriage on which a recording head for recording onto recording paper is mounted and which moves;
   a conveying path which conveys the recording paper or an original;
   a reading unit which reads an image of the original and is movable between a reading position adapted to read the original which is conveyed on the conveying path and a retracting position where the reading unit is retracted from reading position; and
   a platen which supports the recording paper at a position that faces the recording head, is coupled with the reading unit, and is moved when the reading unit moves,
   wherein at the time of a reading operation, the reading unit is arranged on an upper side of the conveying path and, at the time of a recording operation, the platen is arranged on a lower side of the conveying path and the reading unit is moved to a lower side of the platen.

2. An apparatus according to claim 1, wherein the reading unit is rotated to an apparatus main body around a fulcrum, as a rotational center, arranged on a downstream side of the reading unit in a conveying direction of the original.

3. An apparatus according to claim 2, wherein the platen is spring-urged to the reading unit in a direction opposite to a direction where the reading unit is rotated from the retracting position to the reading position.

4. An apparatus according to claim 1, wherein the reading unit has a reading sensor for reading the original and a white reference member.

5. An apparatus according to claim 4, wherein the reading sensor is rotatable to the white reference member around a fulcrum, as a rotational center, arranged on an upstream side of the white reference member in a conveying direction of the original.

6. An apparatus according to claim 1, wherein the recording head is an ink-jet re cording head for recording by discharging ink from discharge ports.

* * * * *